(12) United States Patent
Katsuda et al.

(10) Patent No.: US 6,276,717 B1
(45) Date of Patent: Aug. 21, 2001

(54) CUSHION FOR AIR BAG GAS GENERATOR

(75) Inventors: Nobuyuki Katsuda; Kenji Sanda, both of Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/466,693

(22) Filed: Dec. 20, 1999

Related U.S. Application Data (62) Division of application No. 08/960,625, filed on Oct. 29, 1997.

(30) Foreign Application Priority Data

Aug. 12, 1997 (JP) ................................................. 9-217842

(51) Int. Cl.⁷ .................................................. B60R 21/26
(52) U.S. Cl. ........................ 280/736; 280/740; 264/155
(58) Field of Search .................................. 264/153, 154, 264/155; 83/922, 697, 176; 280/740, 741, 736

(56) References Cited

U.S. PATENT DOCUMENTS

| 1,994,763 | * | 3/1935 | Gardner | ................................... 18/58 |
| 4,590,041 | | 5/1986 | Hill . | |
| 4,902,036 | | 2/1990 | Zander et al. . | |
| 5,635,002 | * | 6/1997 | Oikawa et al. | ....................... 156/196 |
| 5,645,296 | * | 7/1997 | Okada et al. | ......................... 280/736 |

* cited by examiner

*Primary Examiner*—Kenneth R. Rice
*Assistant Examiner*—Lynda Jasmin (57) ABSTRACT

Cushion members, for an air bag gas generator, that have sufficient elasticity to secure gas generating agents and that can also be easily manufactured is provided. Further, an air bag gas generator using such cushion members is provided. In the cushion members for prohibiting movement of a member, contained in the housing, the surface characteristic of upper or lower surface, of both surfaces are designed such that the cushion members are laid on top of another, they do not adhere to each other. The air bag gas generator using the cushion members is to be provided.

20 Claims, 5 Drawing Sheets

CUSHION FOR AIR BAG GAS GENERATOR

This application is a Div of Ser. No. 08/960,625 filed Oct. 29, 1997.

FIELD OF THE INVENTION

The present invention is directed to a cushion employed in an air bag gas generator, which protects a passenger from an impact. It also directed to an air bag gas generator, which employs such a cushion member.

DESCRIPTION OF THE RELATED ART

A gas generator for an air bag usually comprises, within a housing having gas discharge ports: igniting means which is activated on impact; gas generating agents, which are ignited upon activation of the igniting means and burn to produce a combustion gas; a filter, which purifies the combustion gas, and/or a coolant, which cools the combustion gas. Solid gas generating agents, which are formed into a suitable shape, are normally used as the gas generating agents. If the gas generating agents are provided in the housing as they are, the agents may break due to their movement within the housing or by the vibration of the gas generator.

Therefore, in a conventional gas generator, the gas generating agents, etc., contained in the housing are supported by a suitable support member to prohibit their movement or destruction.

In a conventional art, the art of combining a ceramic fiber plate and a spring such that the spring supports, by its elasticity, the plate having a ceramic fiber layer, and supporting the agents by the layer is disclosed as the support member (U.S. Pat. No. 4,590,041). In another conventional art, the art of providing an inactive spacing pad between the agents and an inner surface of the housing to prevent movement of the agent is disclosed (U.S. Pat. No. 4,902,036) as the support member.

However, when the gas generating agents are supported in the above-described manner, a sufficient elastic force cannot be obtained since the support members are made of fiber. Therefore, these support members are not for prohibiting the movement of the gas generating agents.

SUMMARY OF THE INVENTION

The present invention resolves the above-mentioned problems by providing an air bag gas generator having a cushion member having a sufficient elasticity to fix the gas generating agents and which can also be easily manufactured. It is also an object of the present invention to provide an air bag gas generator, which uses such a cushion member.

The cushion member for an air bag gas generator of the present invention is characterized in that: in a cushion member for prohibiting movement of a member contained in a housing, a surface characteristic of an upper or a lower surface, or both surfaces of the cushion member has a surface characteristic where when cushion members are stacked together, the surfaces of each cushion member do not stick together. These cushion members are often contained in the housing for the purpose of supporting the gas generating agents, but are not limited thereto. They can also be contained at a suitable location within the housing in order to prohibit movement of other members contained in the housing, such as a transfer charge, etc., contained in the igniting means.

As a preferable surface characteristic of the cushion member, a surface roughness Ra of the cushion member is to be 1 $\mu$m or less by the JIS B-0601 test method. The cushion member having such a surface characteristic can be formed by stacking multiple sheets, made of a synthetic macromolecular resin having a non-adhering surface characteristic even when they are stacked together (e.g., a surface characteristic of 1 $\mu$m or less in surface roughness Ra by the JIS B-0601 test method), and then stamping out the stacked sheets. A sheet having such a surface characteristic can be formed by sandwiching a synthetic macromolecular resin, such as a silicon foam, etc., between PET sheets, etc., having a surface characteristic of 1 $\mu$m or less in surface roughness Ra by the JIS B-0601 test method, and then by peeling off the PET sheets on the upper and lower surfaces thereof. The manufacturing method for the cushion member of the present invention is not limited thereto, and it is also possible to obtain a cushion member having the above characteristic by stamping out a synthetic macromolecular resin with no prescribed surface characteristic, and then providing an appropriate surface treatment, such as rough surface treatment, on its surfaces to obtain the foregoing surface characteristic.

The cushion member of the present invention is intended to prohibit movement, in particular, of a member contained in an air bag gas generator, such as gas generating agents, a transfer charge, etc. If the member whose movement is prohibited by the cushion member is the gas generating agents, it is desirable for the cushion member to have almost the same shape as the plane shape of the combustion chamber, in which the above-mentioned gas generating agents are contained within the housing, for example, a ring shape having an outer diameter of 38–47 mm, an inner diameter of 20–35 mm, and a thickness of 1.0–9.0 mm, or a disc shape having the same outer diameter and thickness as in the ring shaped cushion member, etc. Further, when the cushion member supports a transfer charge of the igniting means installed in the igniting means storage chamber, the cushion member can have almost the same shape as the plane shape of the igniting means storage chamber, for instance, an almost disc shape with an outer diameter of 10–16 mm and a thickness of 1.0–6.0 mm.

The cushion member is provided within the housing, having gas discharge ports, along with the igniting means, which is activated on impact, the gas generating agents, which are ignited upon activation of the igniting means, and burn to generate the combustion gas, and a coolant/filter, which cools the combustion gas and/or collects combustion residues, etc, and the cushion member supports the gas generating agents, thus forming a complete air bag gas generator.

The above-mentioned housing can be formed by casting, forging, or press work, etc., and it is preferably formed by welding a diffuser shell having gas discharge ports and a closure shell having an igniting means storage opening. The two shells can be joined by various welding methods, such as electron-beam welding, laser welding, TIG welding, projection welding, etc. When the diffuser shell and the closure shell are formed by press-molding various types of steel sheet, such as stainless steel sheets, etc., the manufacture of the two shells is made easy and a reduction in manufacturing cost is achieved. By forming the two shells into simple, cylindrical shapes, the press-molding becomes easy. As for the material for the diffuser shell and the closure shell, stainless steel sheets are desirable, but nickel-plated steel sheets may also be used. Moreover, one or more inner cylindrical members can be provided within the housing, as desired, to partition interior space into two or more chambers.

The above-mentioned cushion member is provided on the side of the closure shell and/or the side of the diffuser shell within the housing and can support any members installed in the housing. Therefore, a pair of cushion members can be installed within the housing in an opposing relationship, such that a member installed in the housing, such as a gas generating agents, sandwiched between the cushion members and supported by the cushion members.

The above-mentioned igniting means, which is activated upon impact, can either be mechanical-ignition type igniting means, which is activated by sensing an impact exclusively by means of a mechanical method, or electrical-ignition type igniting means, which is activated by an electrical signal transmitted from an impact sensor that senses an impact.

The mechanical-ignition type igniting means includes: a mechanical-type sensor, which senses an impact via an exclusively mechanical method such as the firing of a firing pin via the movement of a weight, etc.; a detonator, which is ignited when struck by the firing pin fired from the above-mentioned mechanical-type sensor and then burns; and a transfer charge, which is ignited by the flame from the detonator and then burns. On the other hand, the electrical-ignition type igniting means includes: an electrical-type sensor, which senses an impact exclusively by an electrical mechanism; an igniter, which is activated by an electrical signal transmitted from the sensor, which senses an impact; and a transfer charge, which is ignited by the activation of the igniter and then burns. For this electrical sensor, there is, for example, a semiconductor type acceleration sensor, etc. This semiconductor type acceleration sensor has four semiconductor strain gauges formed on a silicon substrate beam, which is designed to deflect when acceleration occurs. These semiconductor strain gauges are bridge connected. When acceleration occurs, the beam is deflected and the surface becomes strained. Because of this strain, the resistance of the semiconductor strain gauges changes, and this resistance change is detected as a voltage signal, which is proportional to the acceleration. In the electrical-ignition type igniting means, in particular, a control unit which further has an ignition evaluation circuit, may be included. The signal from the above-mentioned semiconductor type acceleration sensor is put in the ignition evaluation circuit; the control unit begins calculation at a point at which this impact signal exceeds a certain value. It outputs the activation signal to the gas generator when the calculation result exceeds a certain value.

As the gas generating agents, an inorganic azide based agents, that is known in the art, in particular a sodium azide, such as an equivalent mixture of soda azide and copper oxide, or a non-azide gas generating agent can be used. Various non-azide gas generating agent compositions have been proposed. For example, agents primarily composed of an organic compound containing nitrogen, such as tetrazole, triazole, or the metal salts of these, etc., and an oxidizing agent containing oxygen, such as alkali metal nitrate, etc., and compositions using as their fuel and nitrogen source triaminoguanidine nitrate, carbohydrazide, nitroguanizine, etc., and using as their oxidizing agent the nitrate, chlorate, perchlorate, etc. of an alkali metal or alkali earth metal are known. Any one of these, but not limited thereto, may be used as the gas generating agents in the present invention. The agents are selected as needed according to the burning rate, non-toxicity, and combustion temperature requirements. The gas generating agents are used in a suitable form, such as a pellet, a wafer, a hollow cylinder, multiple holes, a disc, etc.

The filter means, which is accommodated and installed in the housing, is almost cylindrical in shape. The filter means has a function to remove combustion residues produced by the combustion of the gas generating means and to cool the combustion gas. As such filter means, for instance, a known filter for purifying the generated gas and/or a known coolant for cooling the generated gas can be used. Also, a multi-layered wire mesh filter, formed by compression-molding a cylindrical multi-layered form of wire mesh made of a suitable material, can also be used. More specifically, the multi-layered wire mesh filter can be molded: by shaping a plain stitch stainless steel wire mesh into a cylindrical body; repeatedly folding one end of the cylindrical body to form forming a multi-layered cylindrical body; and compression-molding the multi-layered cylindrical body in a mold, or by shaping a plain stitch stainless steel wire mesh into a cylindrical body; pressing this cylindrical body in the radial direction to form a sheet body, rolling the sheet body a plurality of times into a cylindrical shape to form a multi-layered body, and compression-molding this multi-layered body in a mold, etc. The material used for the wire mesh may be a stainless steel such, as SUS304, SUS310S, SUS316 (JIS standard code), etc. SUS304 (18Cr-8Ni-0.06C) stainless steel exhibits excellent corrosion resistance as does the austenitic stainless steel.

The filter means can also employ a dual structure having an inner or outer layer made of a multi-layered wire mesh body. The inner layer can have a function for protecting the filter means from flame of the igniting means bursting toward the filter means, and from the combustion gas of the gas generating agent being ignited by the flame. The outer layer may function as means for inhibiting expansion of the filter means to prevent blocking of a plenum created between the filter means and an outer circumferential wall of the housing, when the filter means expands due to gas pressure when the gas generator is operated. Incidentally, the function for inhibiting the expansion of the filter means can also be achieved by supporting the outer circumference of the filter means with an outer layer made of a multi-layered wire mesh body, a perforated cylindrical body, or a circular belt body, etc.

The gas generator of the present invention has the above-mentioned cushion member contained in the housing, the structures and members described above which are necessary for its operation, and any other structures and members, which are advantageous for operating the gas generator may also be used as needed. As such advantageous structures and members, for example: a "filter support member," provided between an inner cylindrical member, which partitions an igniting means storage chamber on the inner side thereof, and a filter means, and which supports the filter means; a "short-pass preventing means (a plate member, etc.)," which encloses the top end and/or bottom end of the inner circumference of the filter means and which prevents the generated gas to pass through a gap between the filter means and the inner surface of the housing; a "cushion member," which is provided above and/or below the gas generating agents to prohibit the gas generating agents from moving; a "perforated basket," which is cylindrical in shape and having multiple holes, and provided on the inner side of the filter means to prohibit the gas generating means from coming into direct contact with the filter means and to also protect the filter means from the flames arising from the combustion of the gas generating means; a "plenum," which functions as a gas flow channel, formed between the outer surface of the filter means and the inner surface of the side wall of the housing, etc.

The above-mentioned air bag gas generator is placed inside a module case along with an air bag, which is inflated by introducing a gas generated by said gas generator, to constitute an air bag system.

In this air bag system, coupled with the impact sensor that senses an impact, the gas generator is activated and combustion gas is discharged from the discharge ports in the housing. The combustion gas is ejected into the air bag, and because of this, the air bag ruptures the module cover and inflates, creating a cushion for absorbing the impact between hard structures and a passenger inside a vehicle.

Since, the upper and/or lower surface of the cushion member of the present invention has a surface characteristic, where even when cushion members are stacked together, the surface does not stick with another, the cushion member can be easily peeled off the stacked cushion. As a result, the manufacture of the cushion members, and furthermore, the manufacture of the air bag gas generator, are made easy. In particular, when sheets made of synthetic macromolecular resin are stacked and pressed out to form the cushion members, the stacked cushion members can be easily peeled off.

Also, even if a cushion member, which have been peeled off, are later stuck with another cushion member, they can be easily peeled off again.

Furthermore, by employing the cushion member as in the present invention, it is difficult for dust and grit to cling, so that it is possible to avoid a circumstance where the cushion members become dirty at the time of assembly.

DETAILED DESCRIPTION OF THE PREFERRED EMBODIMENTS

Preferred embodiments of the present invention will be described in the following with reference to the drawings.

Figure 1:
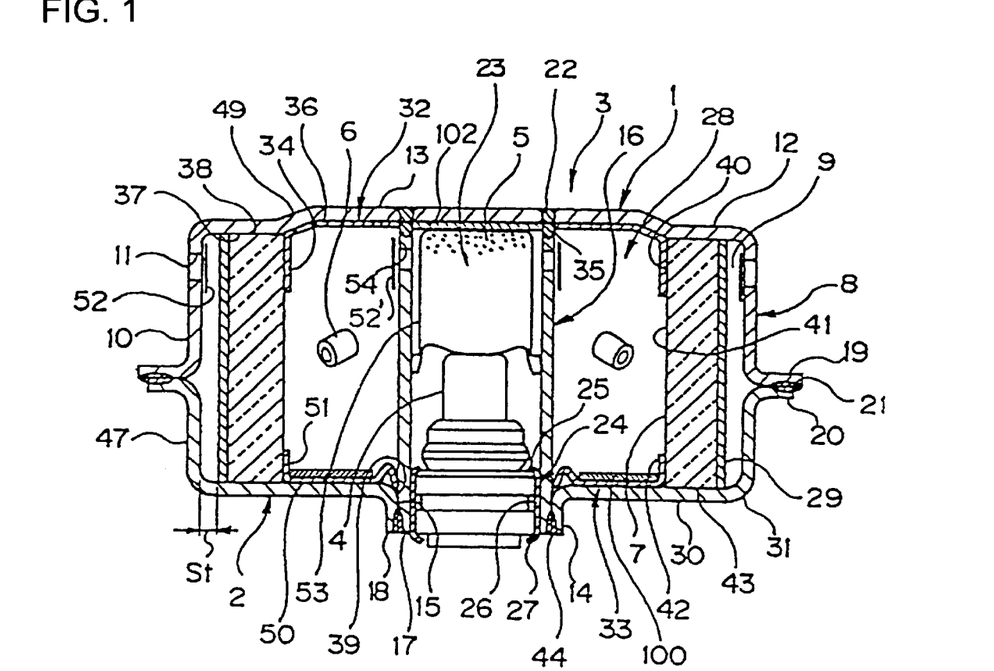
FIG. 1 is a vertical cross-section view showing one embodiment of the gas generator of the present invention.

FIG. 1 is a cross-sectional view of an air bag gas generator of the present invention. This embodiment is effective as a gas generator primarily with a housing having an outer diameter of about 70 mm. In this gas generator, the housing 3, composed of a diffuser shell 1 and a closure shell 2, is partitioned by an inner cylindrical member 16 into an ignitor storage chamber 23, and a combustion chamber 28 for gas generating agents. Igniting means, which ignites and burns the gas generating agents 6 upon its activation by an impact, i.e., the igniting means including an igniter 4 and a transfer charge 5 in this embodiment, is contained in the igniting means storage chamber 23. The combustion chamber 28 is provided with: the gas generating agents 6, which are ignited by the igniting means to produce a combustion gas; a first cushion member 100, which supports the gas generating agent and prohibits its movement; and a second cushion member 102, which supports transfer charge 5.

In the present embodiment, the first cushion member 100, made of a silicone foam, is formed into the same shape as the plane shape of the combustion chamber 28 and placed in the housing on the closure shell side to support the gas generating agents. By supporting the gas generating agents 6 with the cushion member 100, the said gas generating agents 6 do not break even when shaken. The second cushion member 102, made of a silicone foam, is formed into the same shape as the plane shape of igniting means storage chamber 23 and placed inside the igniting means storage chamber 23 on the diffuser shell side to the support transfer charge 5.

Figure 3:
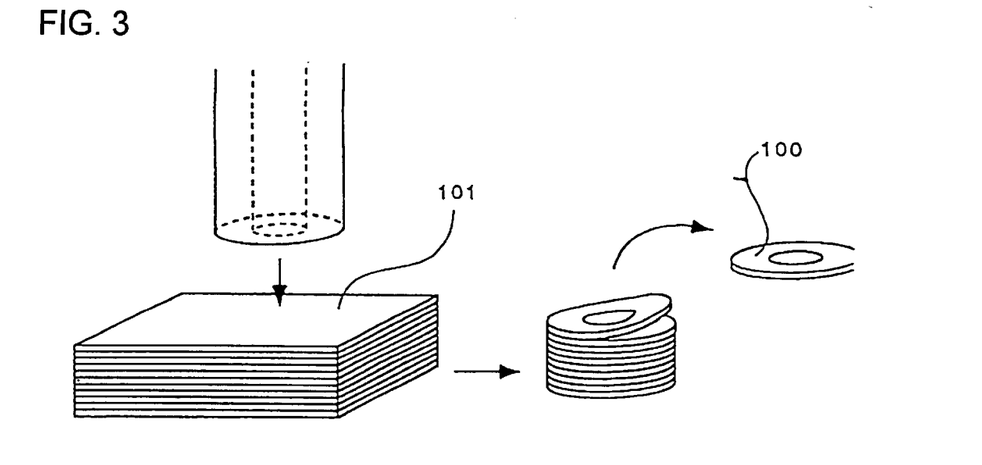
FIG. 3 is an illustration showing one example of a method of manufacturing a cushion member of the present invention.
Figure 4:
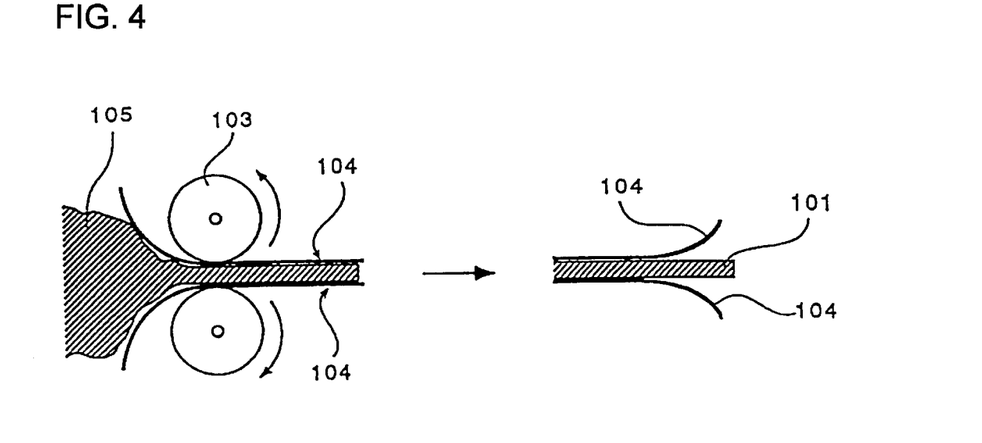
FIG. 4 is an illustration showing the manufacturing method for a sheet body.
Figure 5:
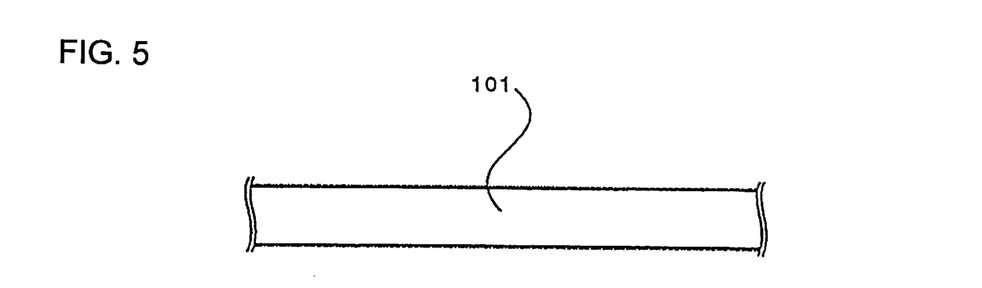
FIG. 5 is an enlarged side view showing the essential part of a sheet body used to manufacture the cushion member of the present invention.

As shown in FIG. 3, these cushion members (100 and 102) can be formed by stacking a plurality of sheets 101, which are made of a synthetic macromolecular resin such as a silicon foam with a surface characteristic of not adhering to each other even when they are stacked together, and then stamping out the sheets. The sheet 101, having the foregoing surface characteristic, can be formed, for example, as shown in FIG. 4, by inserting a silicon foam 105, which is sandwiched between PET sheets having a surface characteristic of 1 μm or less in surface roughness Ra by the JIS B-0601 test method, between opposing rollers 103, and then peeling off the top and bottom PET sheets 104. As shown in FIG. 5, either the top or bottom surfaces or both surfaces of the sheets 101 formed in this manner will have the same surface characteristic as the PET sheet—1 μm or less in surface roughness Ra by the JIS B-0601 test method. Aside from the above-mentioned manufacturing method, the cushion members (100 and 102), in the present invention, can also be formed by stamping out a sheet having a regular surface characteristic to form the cushion member, and then providing various kinds of surface treatments, such as a rough surface treatment, etc., on its surface. Incidentally, in the manufacturing method in which various surface treatments are provided later on, the surface treatments may be provided to the sheet before being stamped out to form the cushion member.

By forming the first and second cushion members (100 and 102) by stamping out the sheets 101 having this kind of surface characteristic, the surfaces of the cushion members have the same surface characteristic as that of the sheets 101. Therefore, Even when the cushion members are stacked, they will not stick together. Accordingly, by forming the cushion members by stamping out the stacked sheets 101, each cushion member, which is stacked on top of another, will not adhere to each other and can be easily separated piece by piece.

When the cushion member 100, formed by stamping out a plurality of stacked sheets 101, is intended to support the gas generating agents 6, it is stamped out into a shape corresponding to the plane shape of the combustion chamber, in which the gas generating agents in the housing are contained. Such a cushion member can have, for example, a ring shape with an outer diameter of 38–47 mm, an inner diameter of 20–35 mm, and a thickness of 1.0–9.0 mm. When the cushion member 102 is intended to support the transfer charge 5 contained in the igniting means, the sheets 101 are stamped out so as to have the same shape as the plane shape of the igniting means storage chamber 23. Such a shape may, for example, be a disc shape having an outer diameter of 10–16 mm and a thickness of 1.0–6.0 mm.

Figure 2:
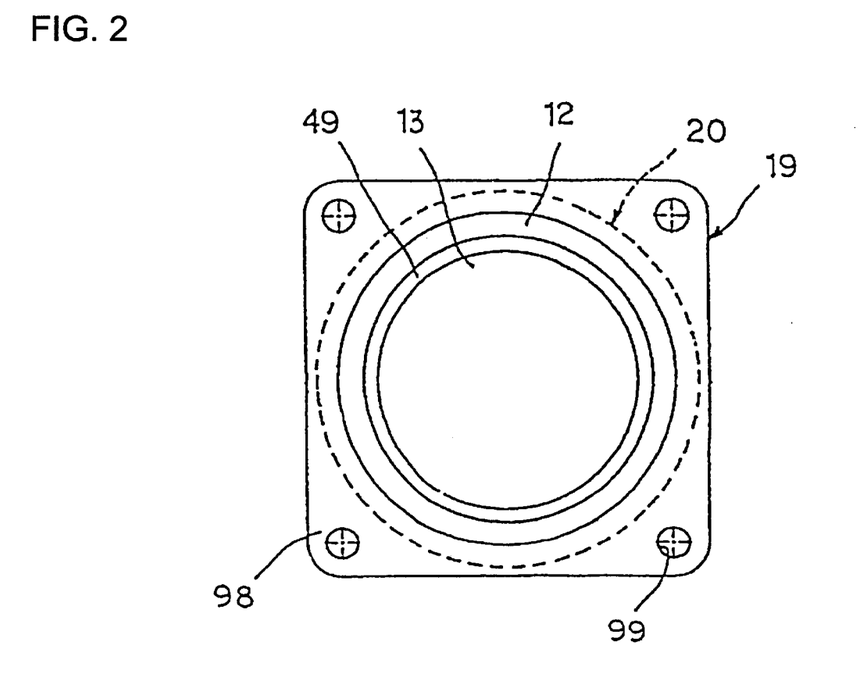
FIG. 2 is a plan view of the same gas generator.

The diffuser shell 1 can be formed either by casting, forging, or by press work, etc., and in the present embodiment, the diffuser shell is formed by pressing a stainless steel sheet. The diffuser shell 1 has a circular portion 12, a circumferential wall portion 10 formed on an outer circumferential portion of the circular portion 12, and a flange portion 19, which is located at the tip of the circumferential wall portion 10 and extends outward in the radial direction. In this example, the circumferential wall portion 10 is provided with eighteen 3 mm diameter gas discharge ports 11 at equal intervals in the circumferential direction. A protruding circular portion 13, which protrudes outward due to the reinforced step 49, is formed at the center of the circular portion 12 of the diffuser shell 1. The reinforced step 49 provides rigidity to the housing, especially to the circular portion 12, which forms its ceiling portion, and also increases the capacity of the storage space. A transfer charge container 53, which contains the transfer charge 5, is held between the protruding circular portion 13 and the igniter 4. The flange portion 19 of the diffuser shell, as shown in FIG. 2, has an attachment portion 98 for the attachment metal fitting of the pad module. The attachment portion 98 is provided at a 90-degree interval in the circumferential direction of the flange portion 19, and has attachment holes 99 for screws. The outer edge of the flange portion 20 on the closure shell side is indicated by the dotted line in FIG. 2.

As in the diffuser shell 1, the closure shell 2 can also be molded by casting, forging, or by press work, etc., and in the present embodiment, the shell is formed by pressing a stainless steel sheet. The closure shell 2 has a circular portion 30, a central opening 15 formed at its center, a circumferential wall portion 47 formed on the outer circumferential portion of the circular portion 30, and a flange portion 20, which is located at the tip of the circumferential wall portion 47 and which extends outward in the radial direction. The central opening 15 has, at the edge thereof, a portion 14 bent in the axial direction. The bent portion 14 provides rigidity to the edge of the central opening 15 and also provides a relatively large joint face with the inner cylindrical member 16. The inner cylindrical member 16 is provided so as to fit into the central opening 15, and an end surface 17 of one end of the inner cylindrical member 16 is designed to become level with the end surface 18 of the bent portion 14.

The diffuser shell 1 and the closure shell 2 are joined to form the housing 3 by overlapping the flange portion 19 of the diffuser shell and the flange portion 20 of the closure shell in the vicinity of the cross-section perpendicular to the middle of the axial direction of the housing 3, and providing with laser welding 21. The flange portions 19 and 20 provide rigidity to the housing, especially to its outer circumferential wall 8, to prevent deformation of the housing due to the gas pressure.

As described above, the inner cylindrical member 16 is provided in the housing and the inside thereof is used as the igniting means storage chamber 23 and the outside thereof is used for the combustion chamber 28. The inner cylindrical member 16 can be formed by either casting, forging, or by press or cutting work, or by a combination of these. When the press work is used, the inner cylinder is formed, for example, by the UO press method (a sheet is molded into a U-shape, then molded into an O-shape, and the seam is welded), the electric seam tube method (the sheet is molded into a circular shape, and the seam is welded with resistance heat by running a large electrical current while adding pressure to the seam.), etc. The inner cylindrical member 16 has igniter holding member 24, and the holding member 24 is composed of a flange portion 25, which faces inward to restrict axial direction movement of the igniter 4, a circumferential wall portion 26 to which the igniter is engaged to be secured on the inner circumferential surface of inner cylindrical member 16, and a crimping portion 27, which secures the igniter in the axial direction by crimping the above-mentioned inward facing flange portion 25. The inner cylindrical member 16 also has through-holes 54 at a side closer to one end thereof. In the present embodiment, six 2.5 mm diameter through-holes are provided at equal intervals in the circumferential direction, and the through-holes 54 are closed with a seal tape 52'.

In this embodiment, the inside of the housing 1 is also provided with the coolant/filter 7, which purifies and cools the gas generated by ignition and combustion of the gas generating agents 6. The coolant/filter 7 is provided, surrounding the gas generating agents 6, and defines a circular chamber, i.e., the combustion chamber 28, around the inner cylindrical member 16. In this embodiment, the coolant/filter 7 is formed by overlaying plain stitched, stainless steel wire mesh in the radial direction, and compressing the wire mesh in radial and axial directions. In the coolant/filter 7, formed in this manner, the shape of the loop-like stitches, in each layer, are crushed, and these form the layer in the radial direction. Therefore, in addition to the coolant/filter cooling the generated gas, its spacing structure becomes complex thus enabling it to collect the residues efficiently. In order to prevent the space 9 from being blocked due to the expansion of coolant/filter 7 by the gas pressure during the operation of the gas generator, the outer layer 29, which functions as the inhibiting means to inhibit the expansion of the coolant/filter, is formed on the outer side of the coolant/filter 7. The outer layer 29 can be formed, for example, by a multi-layered wire mesh body, by a perforated cylindrical member, which has through-holes on the circumferential wall surface, or by a belt-shaped inhibiting layer in which a belt member with a prescribed width is made round. When the outer layer 29 is formed by the laminated wire mesh body, the outer layer 29 can also have a cooling function. The combustion chamber 28 is defined inside of the coolant/filter 7, and the combustion gas generated in the combustion chamber is cooled, and the combustion residue is collected.

A tilted portion 31 is formed in the circumferential direction, enclosing a circular portion 30 of the closure shell. The tilted portion 31 functions as a movement-prohibiting means, which prohibits movement of the coolant/filter 7. It also defines a space between the outer circumferentialwall 8 of the housing and the coolant/filter 7.

The gas generating agents 6 provided in the combustion chamber 28 are solid. In the present embodiment, they are hollow cylinders. Because of this shape, combustion occurs at the outer and inner surfaces. Therefore, this shape has an advantage that even as the combustion progresses, the surface area of the entire gas generating agent changes very little. For the gas generating agent, known agents, such as azide gas generating agent or non-azide gas generating agent, etc., can be used. For the azide gas generating agent, for example, an inorganic azide based agent that are widely used in the art, in particular a sodium azide, such as an equivalent mixture of soda azide and copper oxide, etc., can be used. For the non-azide gas generating agent, an agent primarily composed of an organic compound containing nitrogen, such as tetrazole, triazole, or the metal salts of these, etc., and an oxidizing agent containing oxygen, such as alkali metal nitrate, etc., and compositions using as their fuel and nitrogen source triaminoguanidine nitrate, carbohydrazide, nitroguanizine, etc., and using as their oxidizing agent the nitrate, chlorate, perchlorate, etc., of an alkali metal or alkali earth metal can be used. In view of their safety and other aspects, the non-azide gas generating agents are advantageous.

Since the solid gas generating agents, provided in this combustion chamber, are supported by the cushion members having a sufficient elasticity, the movement of the agents can be prohibited, which prevents the agent from braking due to the vibration and changes the surface area of the agents.

In FIG. 1, a plate member 32 is provided on the upper end portion of the coolant/filter 7, and a plate member 33 is provided on the lower end portion. The plate member 32 is composed of a circular portion 36, which closes an opening 40 at the top end of the coolant/filter 7, and a circumferential wall portion 34, which is incorporated into the circular portion 36 and directly contacts an inner circumferential surface 41 of the coolant/filter. The circular portion 36 has a center opening 35, which engages with the outer circumference of the inner cylindrical member 16. The circumferential wall portion 34 is positioned to face through-holes 54 for the flame from the igniting means flame, and covers the inner surface 41 of the coolant/filter near through-holes 54. The circumferential wall portion 34 functions to protect the coolant/filter from the flame bursting toward the coolant/filter 7 and also changes the direction of the flame to make the flame spread sufficiently toward the gas generating agents 6. Regarding movement in the radial direction, the plate member 32 is secured to inner cylindrical member 16. It functions as means to determine the position of the coolant/filter 7 when assembling the gas generator, and also functions as a short-pass prevention means, which prevents the so-called short-passing of the combustion gas. That is, the combustion gas does not pass through the coolant/filter but passes through a gap created between the inner surface 37 of the housing and the end surface 38 of the coolant/filter due to the pressure of the combustion gas when the gas generator is operated. On the other hand, the plate member 33 is composed of a circular portion 50 which closes off the opening 42 in the bottom of the coolant/filter 7, and the circumferential wall portion 51, which is incorporated into the circular portion 50, and directly contacts the inner circumferential surface 41 of the coolant/filter. The circular portion 50 has a central opening 39 which engages with the outer circumference of the inner cylindrical member 16, and it directly contacts the existing gas generating agents to inhibit the movement of the gas generating agents. The plate member 33 is held between the inner cylindrical member 16 and the coolant/filter 7 by an elastic force, preventing the combustion gas from short-passing at the above-mentioned end surface 38 and the opposite end surface 43 of the coolant/filter.It also functions as a protection plate against welding.

The plenum 9 is formed between the outer circumferential wall 8 of the housing and the outer layer 29 of the coolant/filter. The plenum 9 forms, around the coolant/filter 7, a gas channel whose cross-section in the radial direction is circular. It is desirable that the area St in the radial direction cross-section of the gas channel be greater than the total sum At of the opening area of each gas discharge port 11 of the diffuser shell. In the present embodiment, the area of the radial direction cross-section of the gas channel is constant, but it is possible to increase the area of the radial direction cross-section of the gas channel as it gets closer to the gas discharge ports 11, for example, by forming the coolant/filter into a cone shape. In this case, for the area of the radial direction cross-section of the gas channel, a mean value may be used. Due to the existence of the gas channel around the coolant/filter, the combustion gas passes through the entire region of the coolant/filter towards the gas channel. Because of this, effective use of the coolant/filter and effective cooling and purifying of the combustion gas are achieved. The combustion gas, which has been cooled and purified, passes through the above-mentioned gas channel and reaches the gas discharge ports 11 in the diffuser shell.

Incidentally, in the present embodiment, an explanation was given referring to an example in which a plenum is formed between the outer circumferential wall of the housing and the coolant/filter, but the plenum may not be necessary.

In order to prevent moisture from entering the housing 3, gas discharge ports 11 in diffuser shell 1 are sealed with an aluminum tape 52.

The igniting means, in this embodiment, is an electrical ignition type that comprises an igniter 4 and a transfer charge 5. Aside from this, a mechanical ignition type, which is activated upon sensing an impact exclusively by a mechanical method, may also be used, i.e., an igniting means comprising a mechanical sensor which senses an impact via an exclusively mechanical method such as the firing of a firing pin via the movement of a weight, etc., a detonator which is ignited when struck by a firing pin fired from said mechanical type sensor and then burns, and a transfer charge which is ignited by the flame from the detonator.

The gas generator is assembled by: placing the diffuser shell 1 having the inner cylindrical member 16 joined thereto, with its protruding circular portion 13 at the bottom; passing the plate member 32 through the inner cylindrical member 16; fitting the coolant/filter 7 around the outside of the circumferential wall portion of the plate member 32, which determines the position of coolant/filter 7; and filling the inside with the solid gas generating agents 6; providing the cushion member 100 over the gas generating agents 6 and then further providing the plate member 33 on top of this. Then, inserting the central opening 15 of the closure shell through the inner cylindrical member 16; laying the flange portion 20 of the closure shell over the flange portion 19 of the diffuser shell; and providing laser welding 21 and 44 to join the diffuser shell 1 with the closure shell 2 and the closure shell 2 with the inner cylindrical member 16. Finally, inserting the transfer charge container 53 and the igniter 4 into the inner cylindrical member 16, and then securing them by crimping the crimping portion 27 of the igniter holding member. The Flange portions 19 and 20, which overlap and join in the vicinity of the central horizontal cross-section with respect to the axial direction of the housing, provide rigidity to the outer circumferential wall 8 of the housing to prevent deformation of the housing due to the gas pressure.

In the gas generator having this structure, when the sensor (not shown in the FIG.) senses an impact, its signal is sent to the igniter 4 to activate the igniter 4. Because of this, the transfer charge 5 inside the transfer charge container 53 is ignited and produces a high temperature flame. This flame bursts from the through-holes 54 and ignites gas generating agents 6 near the through-holes 54 and also ignites the gas generating agents at the lower area of the combustion chamber, with its course being deflected by the circumferential wall portion 34. Due to this, the gas generating agents burn and produce a high-temperature/high-pressure gas and the combustion gas passes through the entire region of the coolant/filter 7, during which period it is effectively cooled or its combustion residue collected. The combustion gas which has been cooled and purified passes through the gas channel (plenum 9), ruptures the wall of the aluminum tape 52, ejects from the gas discharge ports 11, and flows into the air bag (not shown in the FIG.). Because of this, the air bag inflates and forms a cushion between the passenger and hard structures, protecting the passenger against an impact.

Figure 6:
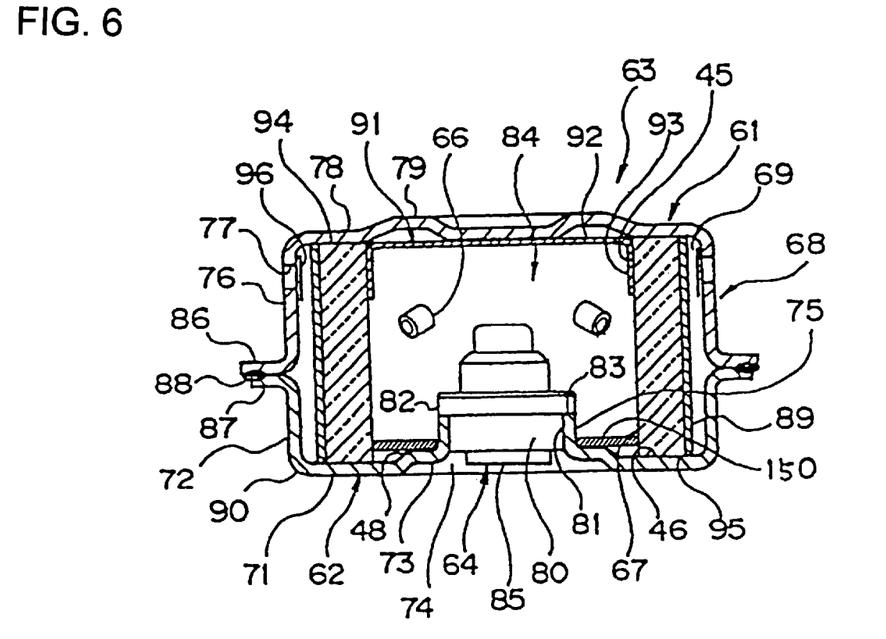
FIG. 6 is a vertical cross-sectional view showing another embodiment of the gas generator of the present invention.

FIG. 6 shows another preferred embodiment of an air bag gas generator, in which the inner cylindrical member is not provided in the housing and the inside of the housing consists of a single chamber. This gas generator includes a housing 63 which comprises: a diffuser shell 61 and a closure shell 62; an igniter 64 provided in a storage space in the housing 63; solid gas generating agents 66, which are ignited by the igniter 64 and generate the combustion gas, a cushion member 150, which is provided to prohibit the movement of the gas generating agents 66; and a coolant/filter 67, which is provided around the gas generating agents 66.

Figure 7:
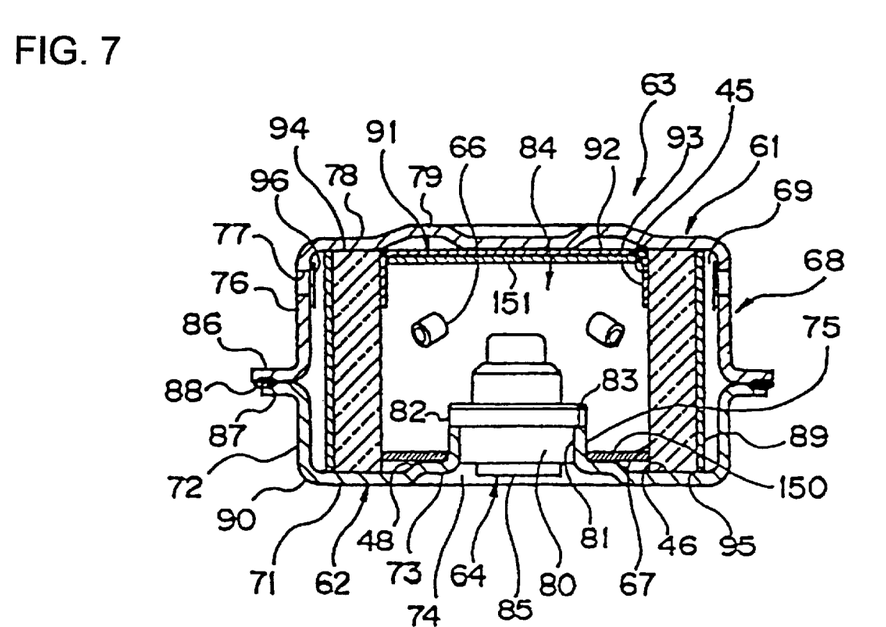
FIG. 7 is a vertical cross-sectional view showing yet another embodiment of the gas generator of the present invention.

As described with respect to FIG. 3, the cushion member 150, which supports the gas generating agents 66, is formed by stamping out the sheets 101 comprising synthetic macromolecular resin, such as silicon foam, into a shape approximating the plane shape of the combustion chamber 84. It is also desirable for the upper or lower surface, or both surfaces of the cushion member 150, in the present embodiment, to have the surface characteristic of $1\mu$ or less in surface roughness RA by the JIS B-0601 test method. In the embodiment shown in FIG. 6, the cushion member 150 is provided only on the side of the closure shell, but as shown in FIG. 7, the doughnut-shaped cushion member 150 can be provided on the side of the closure shell side, or a disc-shaped cushion member 151 can be provided on the side of diffuser shell, or members, such as the gas generating agents, etc., can be sandwiched between both cushion members (150 and 151). The cushion member 151 provided on the side of the diffuser shell can have a shape and size which allows sandwiching of the gas generating agents, etc., between it and the cushion member 150 provided on the side of the closure shell. In FIG. 7, the members identical to those in FIG. 6, are provided with the same legend and the explanation thereof is omitted.

The diffuser shell 61 is formed by pressing a stainless steel sheet and has a circular portion 78, a circumferential wall portion 76 formed on the outer circumferential portion thereof, and a flange portion 86, which is located at its tip and extends in the radial direction. The circumferential wall portion 76 is provided with a plurality of gas discharge ports 77 at equal intervals in the circumferential direction. A plurality of ribs 79 is provided radially on the circular portion 78 of the diffuser shell 61. These rib 79 provide rigidity to the circular portion 78 of the diffuser shell, and because of this, the circular portion 78, which forms the ceiling portion of the housing, is prevented from deforming due to the gas pressure.

The closure shell 62 is formed by pressing a stainless steel sheet, and has a circular portion 71, a circumferential wall portion 72 formed the outer circumferential portion thereof, and a flange portion 87, which is located at its tip and extends in the radial direction. A concavity 73 is formed at the center of the circular portion 71, and a central opening 74 is formed at the center of the concavity 73. This central opening 74 has a bent portion 75 at its edge, bent in the axial direction. The bent portion 75 has an inner circumferential surface 81, into which a drum 80 of the igniter is fitted, and an end surface 83 where a flange 82 of the igniter is secured. Due to the structure of the inner circumferential surface 81 in the axial direction the bent portion 75, a relatively large seal surface is obtained. In order to secure air tightness, a sealing material can fill in the space between the drum 80 of the ignitor and the inner circumferential surface 81. The flange 82 of the ignitor and the end surface 83 can also be welded. The end surface 83, where the flange 82 of the igniter is secured, prevents the igniter 64 from being pushed out by the gas pressure in the combustion chamber 84. The concavity 73 provides rigidity to the circular portion 71 of the closure shell, and the connector bottom surface 85 of the igniter is positioned more toward the inside than the outer surface of the circular portion 71.

The housing 63 is formed by overlaying the flange portion 86 of the diffuser shell 1 and the flange portion 87 of the closure shell 2 in the vicinity of the central cross-section in the axial direction of the housing, and welded together by laser welding 88. These flange portions 86 and 87 provide rigidity to the outer circumferential wall 68 of the housing to prevent deformation of the housing due to the gas pressure.

The igniter 64 is a conventional electrical type igniter, which is activated by a signal from a sensor (not shown in the FIG.). The electrical type igniter is preferable since it does not employ a mechanical method, but has a simple structure, small in size, and light in weight. The igniter 64 (e.g., output: 300–1500 psi in a 10 cc pressure-tight container) is not provided with the transfer charge container 53, as shown in FIG. 1, or the like. This is due to the good ignition and combustion characteristics of the gas generating agents 66. As for the specific requirements, the decomposition temperature of the gas generating agent should be 330° C. or lower, and the combustion temperature of the gas generating agent should be 2000 K or higher. As the gas generating agent, which satisfies these requirements and has excellent ignition and combustion characteristics, an agent such as a guanidine derivative or tetrazole compound, etc., such as 5AT, used as the fuel and strontium nitrate, potassium nitrate, etc., used as the oxidizing agent, can be used. A gas generating agent 66 is a hollow cylinder in shape. This shape is advantageous because the combustion occurs at the outer and inner surfaces, and the surface area of the entire gas generating agent changes very little as the combustion progresses. Further, since this solid gas generating agent is supported by the cushion member 150, it does not break due to vibration.

The coolant/filter 67 is positioned concentrically with the central opening 74, and along with the housing 63, it defines the combustion chamber 84. The coolant/filter 67 is formed by overlaying plain stitched, stainless steel wire mesh in the radial direction, and compressing it in the radial and axial directions. The coolant/filter 67 cools and purifies the gas generated by the combustion of the gas generating agents. The coolant/filter 67 defines the combustion chamber 84. The outer layer 89, composed of a multi-layered wire mesh body, is formed on the outer side of this coolant/filter 67. The outer layer 89 reinforces the coolant/filter as well as cools the gas.

A tilted portion 90 is formed in the circumferential direction, enclosing the circular portion 71 of the closure shell. The tilted portion 90 functions as means to position the coolant/filter 67 or to prohibit its movement. The tilted portion 90 also creates a plenum 69 between the outer circumferential wall 68 of the housing and the outer layer 89 of the coolant/filter.

Many solid gas generating agents 66, each of which is a hollow cylinder in shape, are provided in the combustion chamber 84. The gas generating agents 66 directly fill the space in the combustion chamber, and placed adjacent to the igniter 64. Their movements are restricted by the circular portion 92 of the plate member, which blocks one end opening 45 of the coolant filter 67, and the cushion member. The plate member 91 has the above-mentioned circular portion 92 and the circumferential wall portion 93, which is incorporated into the above-mentioned circular portion 92, and which directly comes into contact with the inner circumferential surface of one end of the coolant/filter 67 in order to cover the inner circumferential surface. By means of the plate member 91, short-passing of the combustion gas between the end surface 94 of one end of the coolant/filter and the inner surface of the circular portion 78 of the diffuser shell is prevented. The end surface 95 of the other end of the coolant/filter, where the plate member 91 is not provided, is secured to the inner surface 46 of the housing by welding. Because of this, short-passing at the end surface 95 is prevented. By the welding, a flame resistant and elastic packing, for example, made of silicon rubber, become unnecessary. This is normally provided between the end surface of the coolant/filter and the inner surface of the housing.

The plenum 69 is formed between the outer circumferential wall 68 of the housing and the outer layer 89 of the coolant/filter, and the plenum 69 forms, around the coolant/filter 67, a circular gas channel in a cross-section of the radial direction. As in the gas generator shown in FIG. 1, the area at the radial direction cross-section of the gas channel is made greater than the total sum of the opening area of each gas discharge port 77 of the diffuser shell. Due to the existence of the gas channel around the coolant/filter, the combustion gas moves toward the gas channel, and the combustion gas passes through the entire region of the coolant/filter. Because of this, effective use of the coolant/filter and effective cooling and purifying of the combustion gas are achieved. The combustion gas, which has been cooled and purified, passes through the above-mentioned gas channel and reaches the gas discharge ports 77 in the diffuser shell. In order to prevent moisture from entering the housing 63, the gas discharge ports 77 in the diffuser shell are sealed with an aluminum tape 96 from the inner side of the housing.

As one example, the gas generator is assembled by: first, placing the closure shell 62 with circular portion 71 thereof at its bottom; and fitting the igniter 64 into its central, opening 74. Next, providing the coolant/filter 67, and providing the inner side thereof with the cushion member 150, and then filling with the solid gas generating agents 66, placing the plate member 91 over it after that, and finally laying flange portion 86 of the diffuser shell over the flange portion 87 of the closure shell. The diffuser shell 61 and the closure shell 62 are joined by laser welding 88. This kind of assembling method for the gas generator of the present invention can be modified as needed.

In the gas generator having the foregoing structure, when the sensor (not shown in the FIG.) senses an impact, its signal is sent to the igniter 64 to activate the igniter 64, which ignites the gas generating agents 66 inside the combustion chamber 84. Because of this, the gas generating agents burn and produce a high-temperature/high-pressure gas. This combustion gas enters the coolant/filter 67 from the entire region of the coolant/filter 67 and passes through the coolant/filter 67, during which period it is cooled or its combustion residue is collected. The combustion gas, which has been cooled and purified, passes through the gas channel formed by plenum 69, ruptures the wall of the aluminum tape 96, ejects from the gas discharge ports 77, and flows into the air bag (not shown in the FIG.). Because of this, the air bag inflates and forms a cushion between a passenger and hard structures, protecting the passenger against an impact. When the housing deforms in the upper and lower direction due to the pressure of the combustion gas, even if a gap is formed between the coolant/filter end surface 94 and the inner surface of the circular portion 78 of the diffuser shell, short-passing of the combustion gas is prevented by the plate member 91. Since the end surface 95 on the opposite side is secured to the housing inner surface by welding, no gap is created between these two. And the flange portions 86 and 87, which overlap and join in the vicinity of the central cross-section in the axial direction of the housing, provide rigidity to the outer circumferential wall 68 of the housing to prevent deformation of the housing due to the gas pressure.

Figure 8:
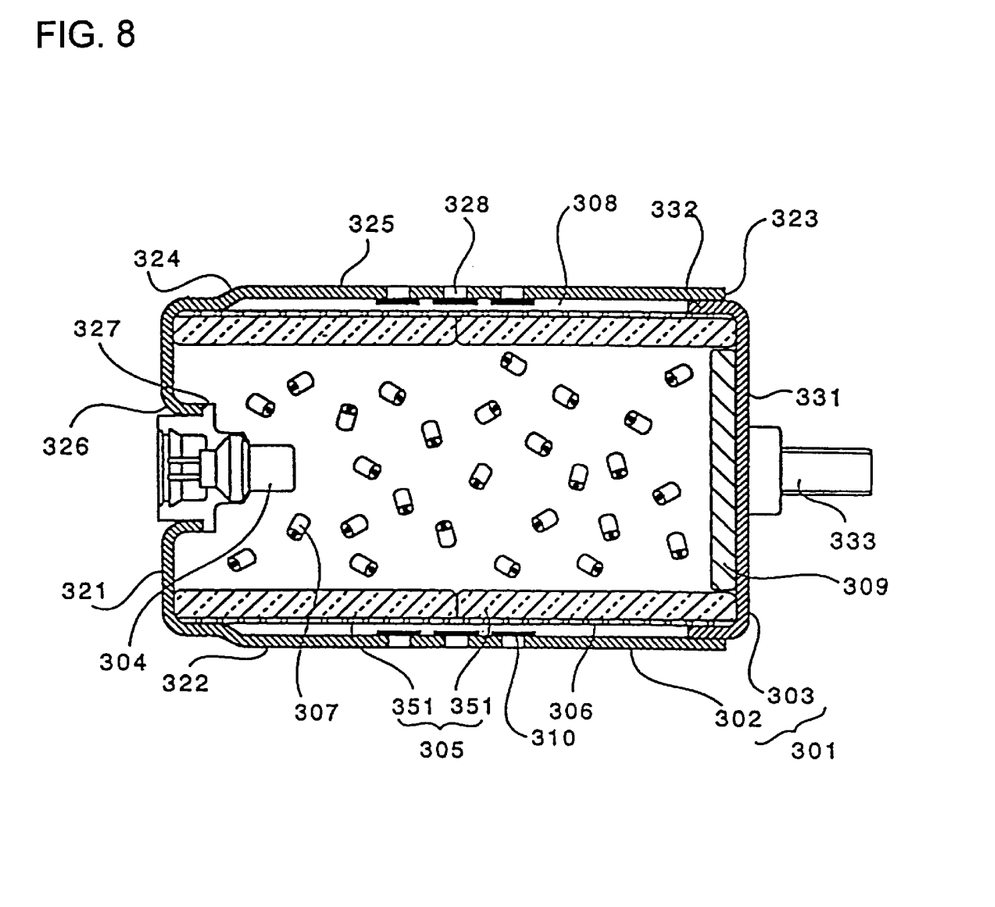
FIG. 8 is a vertical cross-sectional view showing still another embodiment of the gas generator of the present invention.

FIG. 8 shows yet another embodiment of the gas generator of the present invention. The gas generator shown in this embodiment has a cylindrical shape, which is longer in the axial direction, and especially suitable for the passenger side. The housing 301 of the gas generator is formed by inserting an annular-shaped tip portion 332 of a cup-shaped member 303, that has been formed into a cup shape, into other end opening 323 of a cylindrical member 302, which has been formed into a cylindrical shape, and then welding these two into a single form.

The cylindrical member 302 has, at its one end side surface 321, a central opening 326, for receiving igniting means. The central opening 326 is bent along the axial direction of the housing 301 to create igniting means securing portion 327. A circumferential wall 322 of the cylindrical member 302 is provided with gas discharge ports 328 positioned in the circumferential and axial directions and a crank-shaped portion 324, which forms expanded circumferential wall portion 325 where the circumferential wall 322 expands in the radial direction.

The cup-shaped member 303 comprises a side end plane portion 331, which faces one end side surface 321 of cylindrical member 302, and an annular-tip portion 332, which is incorporated into the peripheral edge of the side end plane portion 331 and inserted into other end opening 323 of the cylindrical member 302. At the center of this cup-shaped member 303's side end plane portion 331, a gas generator attaching member 333, which extends in the axial direction of the cup-shaped member 303, is also formed.

The housing 301 formed in this manner contains, as needed: filter means placed with its outer circumference facing the inner side of circumferential wall surface of the housing 301, i.e., a coolant/filter 305; a punching plate 306, which encloses the outer circumference of the coolant/filter 305 and prevents deformation thereof; an igniter 304, which functions as igniting means that is activated upon sensing an impact; gas generating means, which is ignited by the igniting means and generates combustion gas, i.e., gas generating agents 307; and a cushion member 309, which supports the gas generating means. In order to prevent moisture from entering the housing, an aluminum tape 310 is attached to the gas discharge ports 328 of the cylindrical member 302 to seal the gas discharge ports 328.

As in the cushion member shown in FIG. 1, the above-mentioned cushion member 309 also has the surface characteristic wherein cushion members that have been laid on top of another do not stick together. In this embodiment, the cushion member is formed into a flat disc and provided on the side of the end plane portion 331 of the cup-shaped member 303. It is formed into a ring shape and provided on one end side surface 321 of the cylindrical member 302.

In the embodiment shown in this FIG., a crank-shaped portion 324 formed on the circumferential wall 322 of above-mentioned cylindrical member 302 is designed to have an expanded circumferential wall portion 325, which expands only by the thickness of the annular tip portion 332 of the cup-shaped member 303 in the radial direction of the cylindrical member 302. Thus, the above-mentioned coolant/filter 305 is supported by the inner surface of the circumferential wall 322—except for the expanded circumferential wall portion 325 of the cylindrical member 302— and the inner surface of the annular tip portion 332 of the cup-shaped member 303, and creates a plenum 308 between inner surface of the circumferential wall of the housing 301 and the coolant/filter 305. Since this plenum 308 functions as a gas channel, the generated gas can pass through the entire region of the coolant/filter 305, and the gas is effectively cooled and purified.

This gas generator is assembled by: first putting the igniter 304, the punching plate 306, the coolant/filter 305, and gas generating agents 307 into cylindrical member 302, and then closing the other end opening of the cylindrical member by the cup-shaped member 303. In the gas generator formed in this manner, when the sensor (not shown in the FIG.) senses an impact, its signal is sent to the igniter 304 to activate the igniter 304. Because of this, the gas generating agents 307 are ignited, and they burn and generate combustion gas. Since the plenum 308, created on the outer side of the coolant/filter 305, functions as the gas channel, the combustion gas passes through the entire region of the coolant/filter 305, during which period it is effectively cooled or its combustion residue collected. The gas ruptures the wall of the aluminum tape 310 attached over the gas discharge ports 328, and ejects from the gas discharge ports 328. This ejected gas flows into the air bag (not shown in the Figure) to inflate said bag and forms a cushion between a passenger and hard structures.

Figure 9:
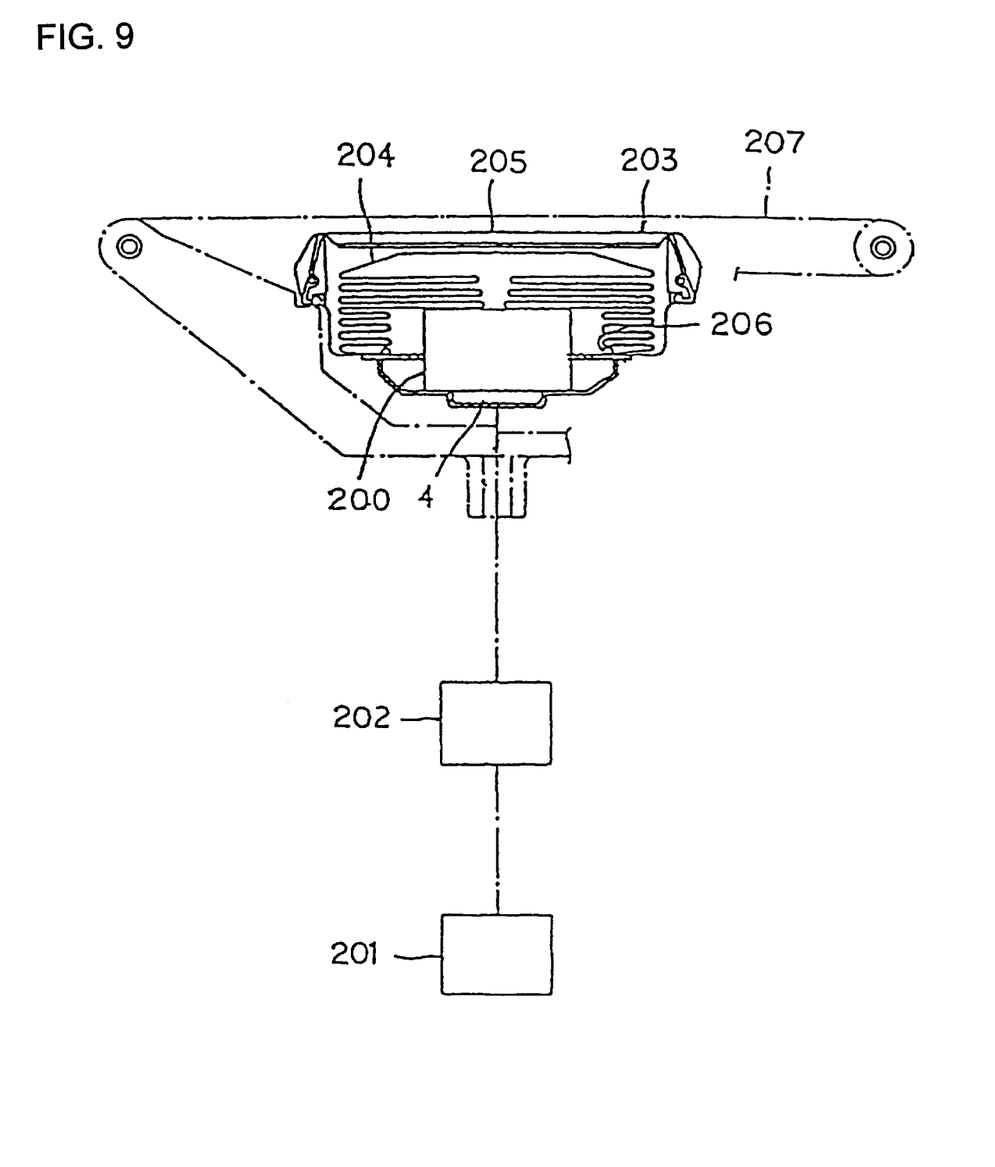
FIG. 9 is a configuration of the air bag system of the present invention.

FIG. 9 shows an embodiment of an air bag system of the present invention constituted to include a gas generator using the electrical ignition type igniting means. This air bag system consists of a gas generator 200, an impact sensor 201, a control unit 202, a module case 203, and an air bag 204.

The gas generator described according to FIG. 1 is used as the gas generator 200, and any member, such as a gas generating agent, a transfer charge, etc., which are contained in the housing, are supported by the cushion member.

The impact sensor 201 comprises, for instance, a semiconductor type acceleration sensor. This semiconductor type acceleration sensor has four semiconductor strain gauges on the silicon substrate beam, which is designed to be deflected when acceleration occurs, and these semiconductor strain gauges are bridge connected. When acceleration occurs, the beam is deflected, and the surface becomes strained. Because of this strain, the resistance of the semiconductor strain gauges changes, and this resistance change is detected as a voltage signal that is proportional to the acceleration.

The control unit 202 has an ignition evaluation circuit, and the signal from the above-mentioned semiconductor type acceleration sensor is put into this ignition evaluation circuit. The control unit 202 begins its calculation at the point at which this impact signal exceeds a certain value. It outputs the activation signal to the igniter 4 of the gas generator 200 when the calculation result exceeds a certain value.

The module case 203, made of a polyurethane, for example, includes a module cover 205. The air bag 204 and the gas generator 200 are installed inside the module case 203 to constitute a pad module. This pad module is attached to a steering wheel 207 of an automobile.

The air bag 204 is made of nylon (nylon 66, for example) or polyester, and it is secured to the flange portion of the gas generator, with the air bag opening 206 enclosing the gas discharge ports of the gas generator while being folded.

When the semiconductor acceleration sensor 201 senses an impact at the time of an automobile collision, its signal is transmitted to the control unit 202, and the control unit 202 begins its calculation at the point at which the impact signal from the sensor exceeds a certain value. It outputs the activation signal to the igniter 4 of the gas generator 200 when the calculation result exceeds a certain value. Because of this, the igniter 4 is activated to ignite the gas generating agents, which then burn and generate gas. This gas is ejected into the air bag 204, whereby the air bag breaks the module cover 205 and inflates, forming a cushion which absorbs the impact between the steering wheel 207 and a passenger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method of manufacturing an air bag gas generator, comprising:

providing a first cushion member and a second cushion member having a surface roughness Ra of 1 μm or less by JIS B-0601 test method such that even when said first cushion member contacts with said second cushion member, a surface of said first cushion member does not adhere to a surface of said second cushion member due to a flatness of surfaces of each of said first cushion member and said second cushion member;

removing said first cushion member away from said second cushion member; and providing said first cushion member inside a housing of the gas generator to prevent movement of an element disposed inside the housing.

2. The method of claim 1, wherein said step of providing said first cushion member includes the step of providing said first cushion member inside the housing to prevent movement of gas generating agents.

3. The method of claim 1, wherein said step of providing said first cushion member includes the step of providing said first cushion member inside the housing to prevent movement of an enhancer.

4. The method of claim 1, wherein said step of providing a first cushion member and a second cushion member includes the steps of, providing a resilient sheet, placing a sheet material having said surface roughness on a surface of said resilient sheet, and pressing said resilient sheet against said sheet material to transfer said surface roughness to the surface of said resilient sheet to form said first cushion member and said second cushion member having said surface roughness.

5. The method of claim 4, wherein said placing step includes the step of placing the sheet material on both sides of said resilient sheet.

6. The method of claim 1, wherein said step of providing a first cushion member and a second cushion member includes the steps of, providing a resilient sheet, and providing a rough surface treatment to a surface of said resilient sheet.

7. The method of claim 6, wherein said rough surface treatment providing step includes the step of providing said rough surface treatment on both sides of said resilient sheet.

8. The method of claim 1, wherein said step of providing a first cushion member and a second cushion member includes the step of providing said first cushion member and said second cushion member made of a macromolecular synthetic resin.

9. The method of claim 8, wherein said macromolecular synthetic resin is a silicon foam.

10. The method of claim 1, wherein said step of providing a first cushion member and a second cushion member includes the step of forming said first cushion member and said second cushion member into a shape substantially corresponding to a plane shape of a combustion chamber, provided within the housing, in which gas generating agents are disposed.

11. The method of claim 1, wherein said step of providing a first cushion member and a second cushion member includes the step of forming said first cushion member and said second cushion member into a shape substantially corresponding to a plane shape of an igniting unit storage chamber.

12. A method of manufacturing an air bag gas generator, comprising:

providing a housing;

providing an ignitor inside the housing;

providing gas generating agents inside the housing and around the ignitor;

providing a filter unit inside the housing such that the filter unit surrounds the gas generating agents;

providing a first cushion member and a second cushion member having a surface roughness Ra of 1 $\mu$m or less by JIS B-0601 test method such that even when said first cushion member contacts with said second cushion member, a surface of said first cushion member does not adhere to a surface of said second cushion member due to a flatness of surfaces of each of said first cushion member and said second cushion member;

removing said first cushion member away from said second cushion member; and providing said first cushion member inside the housing to prevent movement of at least one of said ignitor, gas generating agents, and filter unit inside the housing.

13. The method of claim 12, wherein said step of providing the housing includes the steps of, providing a diffuser shell having diffuser ports, providing a closure shell having a support unit that supports the ignitor, and disposing said first cushion member in contact with at least one of said diffuser shell and said closure shell.

14. A method of manufacturing a cushion member for an air bag gas generator, comprising:

providing a plurality of sheet bodies, each sheet body having a surface roughness Ra of 1 $\mu$m or less by JIS B-0601 test method such that when one of said plurality of sheet bodies is placed on top of another one of said plurality of sheet bodies, a surface of the one of said plurality of sheet bodies does not adhere to a surface of said another one of said plurality of sheet bodies due to a flatness of the surface of said sheet bodies;

stacking said plurality of sheet bodies; and forming said stacked sheet bodies into a desired shape.

15. The method of claim 14, wherein each of said plurality of sheet bodies is formed by, providing a resilient sheet, placing a sheet material having said surface roughness on a surface of said resilient sheet, and pressing said resilient sheet against said sheet material such to transfer said surface roughness to the surface of said resilient sheet.

16. The method of claim 15, wherein said resilient sheet is made of a macromolecular synthetic resin.

17. The method of claim 15, wherein said resilient sheet is pressed against said sheet material by passing said resilient sheet and said sheet material between a pair of rollers.

18. The method of claim 14, wherein said forming step includes the step of stamping said stacked sheet bodies into the desired shape.

19. The method of claim 18, wherein said macromolecular synthetic resin is a silicon foam.

20. The method of claim 14, further comprising:

removing each of said formed sheet bodies from said stacked sheet bodies before placing into the airbag gas generator.

* * * * *